United States Patent
Jiang et al.

(10) Patent No.: US 8,387,439 B2
(45) Date of Patent: Mar. 5, 2013

(54) METHOD AND DEVICE FOR DETERMINING A SIGNAL OFFSET OF A ROLL RATE SENSOR

(75) Inventors: Zheng-Yu Jiang, Regensburg (DE); Matthias Kretschmann, Regensburg (DE); Jens Daniel Schlachter, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 700 days.

(21) Appl. No.: 12/524,025

(22) PCT Filed: Jan. 14, 2008

(86) PCT No.: PCT/EP2008/050354
§ 371 (c)(1),
(2), (4) Date: Jan. 5, 2010

(87) PCT Pub. No.: WO2008/092730
PCT Pub. Date: Aug. 7, 2008

(65) Prior Publication Data
US 2011/0226036 A1    Sep. 22, 2011

(30) Foreign Application Priority Data
Jan. 30, 2007   (DE) .................. 10 2007 004 606

(51) Int. Cl.
*G01P 21/00* (2006.01)
*G01P 3/44* (2006.01)
*B60W 40/10* (2012.01)

(52) U.S. Cl. .............. 73/1.37; 702/87; 702/96

(58) Field of Classification Search ............. 73/1.37; 701/33.1; 702/87, 96
See application file for complete search history.

(56) References Cited

U.S. PATENT DOCUMENTS

| | | | | |
|---|---|---|---|---|
| 1,853,069 A | * | 4/1932 | Minorsky | 114/124 |
| 4,026,159 A | * | 5/1977 | Isakson et al. | 73/504.06 |
| 5,321,616 A | | 6/1994 | Okuda et al. | 701/37 |
| 5,719,790 A | | 2/1998 | Lohrenz et al. | 702/104 |
| 5,789,658 A | * | 8/1998 | Henn et al. | 73/1.37 |
| 6,332,104 B1 | | 12/2001 | Brown et al. | 701/1 |
| 6,421,622 B1 | * | 7/2002 | Horton et al. | 702/95 |

(Continued)

FOREIGN PATENT DOCUMENTS

| | | |
|---|---|---|
| DE | 19502858 C1 | 7/1996 |
| DE | 69126929 T2 | 11/1997 |

(Continued)

OTHER PUBLICATIONS

International PCT Search Report, PCT/EP2008/050354, 6 pages, Mailed Jul. 25, 2008.

(Continued)

*Primary Examiner* — Thomas P Noland
(74) *Attorney, Agent, or Firm* — King & Spaulding L.L.P.

(57) ABSTRACT

In order to determine a signal offset (OFS_SIG) of a roll rate sensor in a vehicle (10), a roll rate sensor signal (OMEGA_ROLL_SIG) is detected. A transversal acceleration (AC) of the vehicle (10) is determined. A temporal derivative (DRV_AC) of the transversal acceleration (AC) is determined. Verification is made as to whether a value of the temporal derivative (DRV_AC) of the transversal acceleration (AC) is smaller than a predefined first threshold value (THD_1). The signal offset (OFS_SIG) of the roll rate sensor is determined in accordance with the roll rate sensor signal (OMEGA_ROLL_SIG) if the value of the temporal derivative (DRV_AC) of the transversal acceleration (AC) is smaller than the predefined first threshold value (THD_1).

14 Claims, 3 Drawing Sheets

U.S. PATENT DOCUMENTS

| | | | |
|---|---|---|---|
| 6,650,971 B2 | 11/2003 | Haas | 701/1 |
| 7,085,642 B2 | 8/2006 | Samuel et al. | 701/82 |
| 2004/0030474 A1 | 2/2004 | Samuel et al. | 701/36 |
| 2005/0004730 A1 | 1/2005 | Suzuki et al. | 701/38 |
| 2008/0077347 A1* | 3/2008 | Chung | 702/87 X |
| 2009/0299546 A1* | 12/2009 | Hac et al. | 701/1 |
| 2009/0299579 A1* | 12/2009 | Hac et al. | 701/46 |
| 2011/0004359 A1* | 1/2011 | Kretschmann et al. | 701/1 |

FOREIGN PATENT DOCUMENTS

| | | |
|---|---|---|
| DE | 102004035576 A1 | 2/2006 |
| EP | 1388473 A1 | 2/2004 |
| JP | 2001213300 | 8/2001 |
| JP | 2002310644 A | 10/2002 |
| JP | 2005022553 A | 1/2005 |
| JP | 2005069294 | 3/2005 |
| WO | 2006/010466 A1 | 2/2006 |
| WO | 2008/046700 A1 | 4/2008 |

OTHER PUBLICATIONS

German Office Action, German application No. 10 2007 004 606.7-52, 3 pages, in German, Mailed Jul. 11, 2007.

* cited by examiner $$OFF\_SIG = \frac{1}{t_1 - t_0} \int_{t_0}^{t_1} (OMEGA\_ROLL\_SIG) dt$$

$$AC \approx \frac{L}{2S}(VEL\_WHEEL\_3 - VEL\_WHEEL\_4)(VEL\_WHEEL\_3 + VEL\_WHEEL\_4)$$

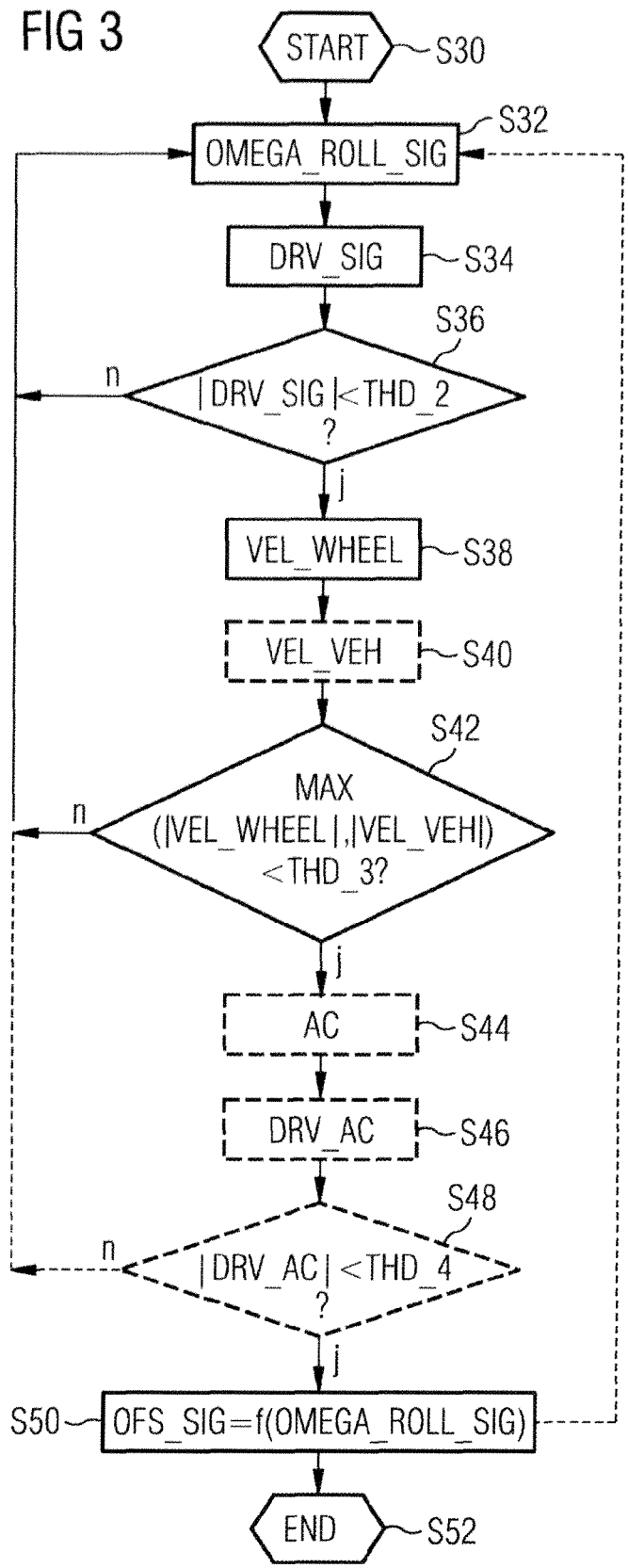

METHOD AND DEVICE FOR DETERMINING A SIGNAL OFFSET OF A ROLL RATE SENSOR

CROSS-REFERENCE TO RELATED APPLICATIONS

This application is a U.S. National Stage Application of International Application No. PCT/EP2008/050354 filed Jan. 14, 2008, which designates the United States of America, and claims priority to German Application No. 10 2007 004 606.7 filed Jan. 30, 2007, the contents of which are hereby incorporated by reference in their entirety.

TECHNICAL FIELD

The invention relates to a method and a device for determining a signal offset of a roll rate sensor.

BACKGROUND

The signal of the roll sensor is representative of a roll rate of the motor vehicle. The roll rate describes a rotation of the motor vehicle about a longitudinal axis of the motor vehicle, which extends through a center of gravity of the motor vehicle. If the motor vehicle is not rotating about the longitudinal axis of the motor vehicle, the roll rate sensor should generate a signal which is representative of the roll rate equating to zero. However roll rate sensors generally have a signal offset. The signal offset can also be referred to as offset. The signal offset causes the roll rate sensor to signal a roll rate which does not equate to zero even in an absolute rest position of the sensor. If the signal offset is known, this can be accounted for when the roll rate is determined. The roll rate can thus be determined particularly precisely by knowing the signal offset.

SUMMARY

According to various embodiments a method and a device for determining a signal offset of a roll rate sensor can be created, which easily enables a particularly precise determination of the signal offset of the roll rate sensor.

According to one embodiment, a method for determining a signal offset of a roll rate sensor of a motor vehicle, may comprise the steps of:—detecting a signal of the roll rate sensor,—determining a transversal acceleration of the motor vehicle,—determining a temporal derivative of the transversal acceleration,—carrying out a check to determine whether a value of the temporal derivative of the transversal acceleration is smaller than a predefined first threshold value,—determining the signal offset of the roll rate sensor as a function of the signal, if the value of the temporal derivative of the transversal acceleration is smaller than the predefined first threshold value.

According to a further embodiment, the signal of the roll rate sensor can be detected over a predefined period of time and the signal offset is only determined as a function of the portions of the signal of the roll rate sensor, which are detected while the value of the temporal derivative of the transversal acceleration is smaller than the predefined first threshold value. According to a further embodiment, the transversal acceleration of the motor vehicle can be determined with a transversal acceleration sensor. According to a further embodiment, the transversal acceleration of the motor vehicle can be determined as a function of at least two wheel speeds of wheels of the motor vehicle. According to a further embodiment, a temporal derivative of the signal of the roll rate sensor can be determined and in which the signal offset of the roll rate sensor is determined as a function of the signal of the roll rate sensor, if a value of the temporal derivative of the signal of the roll rate sensor is smaller than a predefined second threshold value. According to a further embodiment, the wheel speed of the at least one wheel of the motor vehicle can be determined and in which the signal offset of the roll rate sensor is determined as a function of the signal of the roll rate sensor, if a value of the determined wheel speed of the corresponding wheel is smaller than a predefined third threshold value. According to a further embodiment, a motor vehicle speed can be determined and in which the signal offset of the roll rate sensor is determined as a function of the signal of the roll rate sensor, if a value of the determined motor vehicle speed is smaller than the predefined third threshold value.

According to another embodiment, a device for determining a signal offset of a roll rate sensor of a motor vehicle, may be operable to—detect a signal of the roll rate sensor,—determine a transversal acceleration of the motor vehicle,—determine a temporal derivative of the transversal acceleration,—carry out a check to determine whether a value of the temporal derivative of the transversal acceleration is smaller than a predefined first threshold value, and to—determine the signal offset of the roll rate sensor as a function of the signal of the roll rate sensor, if the value of the temporal derivative of the transversal acceleration is smaller than the predefined first threshold value.

BRIEF DESCRIPTION OF THE DRAWINGS

Embodiments are described in more detail below with reference to schematic drawings, in which;

FIG. 3 shows a second flowchart of the method for determining the signal offset of the roll rate sensor.

Structurally or functionally identical elements are identified in all the figures with the same reference character.

DETAILED DESCRIPTION

Figure 1:
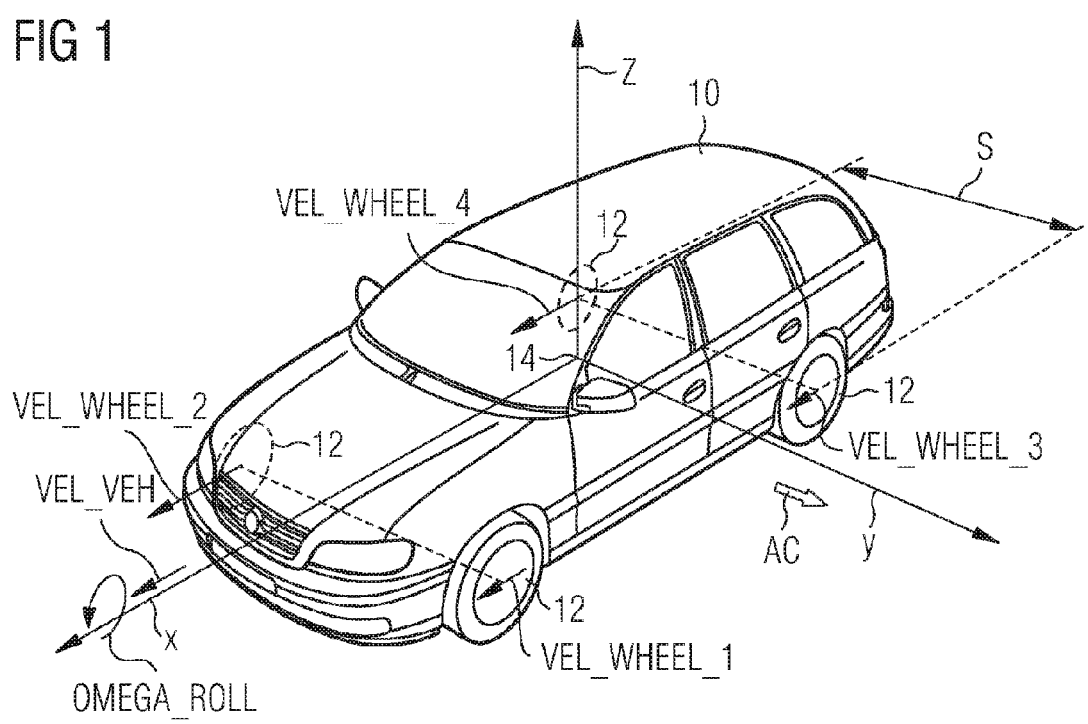
FIG. 1 shows a schematic view of a motor vehicle.

According to various embodiments, in a method and a correspondingly embodied device for determining a signal offset of a roll rate sensor in a motor vehicle, a signal of the roll rate sensor is detected, a transversal acceleration of the motor vehicle is determined, a temporal derivative of the transversal acceleration is determined and a check is carried out to determine whether a value of the temporal derivative of the transversal acceleration is smaller than a predefined first threshold value. The signal offset of the roll rate sensor is determined as a function of the roll rate sensor signal if the value of the temporal derivative of the transversal acceleration is smaller than the predefined first threshold value.

This allows the signal offset of the roll rate sensor of the motor vehicle to be determined. In particular this enables the signal offset of the roll rate sensor to be dynamically determined for a movement of the motor vehicle. This contributes to a precise determination of the signal offset of the roll rate sensor. The signal offset of the roll rate sensor is also referred to as an offset of the roll rate sensor.

In an embodiment, the signal of the roll rate sensor is detected over a predefined period of time and the signal offset is only determined as a function of the portions of the signal of roll rate sensor, which are detected while the value of the temporal derivative of the transversal acceleration is smaller than a predefined first threshold value. Several sub intervals may thus result, in which the signal offset is determined.

Averaging by way of the signal of the roll rate sensor for determining the signal offset can extend across one or more sub intervals. This allows the signal offset of the roll rate sensor to be determined particularly easily and with considerable accuracy during a movement of the motor vehicle.

In a further embodiment, the transversal acceleration of the motor vehicle is determined with a transversal acceleration sensor. A particularly simple and precise determination of the transversal acceleration of the motor vehicle and thus of the signal offset of the roll rate sensor is thus possible.

In a further embodiment, the transversal acceleration of the motor vehicle is determined as a function of at least two wheel speeds of wheels of the motor vehicle. The wheel speed is the speed with which a center of gravity of the wheel moves relative to a road surface, upon which the motor vehicle travels and in particular over which the corresponding wheel rolls. A simple determination of the transversal acceleration of the motor vehicle and thus a determination of the signal offset of the roll rate sensor is in this way also possible without a transversal acceleration sensor.

In a further embodiment, a temporal derivative of the signal of the roll rate sensor is determined and the signal offset of the roll rate sensor is determined as a function of the signal of the roll rate sensor, if a value of the temporal derivative of the signal of the roll rate sensor is smaller than a predefined second threshold value. A simple and precise determination of the roll rate of the motor vehicle and thus a precise determination of the stationary state of the motor vehicle is possible. Consequently a particularly precise determination of the signal offset of the roll rate sensor is possible when the motor vehicle is stationary.

In a further embodiment, the wheel speed of the at least one wheel of the motor vehicle is determined and the signal offset of the roll rate sensor is determined as a function of the roll rate sensor, if a value of the determined wheel speed of the corresponding wheel is smaller than a predefined third threshold value. As a result, a simple and precise determination of the wheel speed of the motor vehicle and thus a precise determination of when the motor vehicle is stationary is possible. This enables a precise determination of the signal offset of the roll rate sensor when the motor vehicle is stationary.

In a further embodiment, the wheel speed of the at least one wheel of the motor vehicle is determined and the signal offset of the roll rate sensor is determined as a function of the signal of the roll rate sensor, if a value of the determined wheel speed of the corresponding wheel is smaller than a predefined third threshold value. A simple and precise determination of the wheel speed of the motor vehicle and thus a precise determination of when the motor vehicle is stationary is possible as a result. This enables precise determination of the signal offset of the roll rate sensor when the motor vehicle is stationary.

In a further embodiment, a motor vehicle speed is determined and the signal offset of the roll rate sensor is determined as a function of the signal of the roll rate sensor if a value of the determined motor vehicle speed is smaller than the predefined third threshold value. A stationary motor vehicle can thus be precisely determined. Furthermore, a particularly precise determination of the signal offset of the roll rate sensor is possible when the motor vehicle is stationary.

FIG. 1 shows a motor vehicle 10, which has a center of gravity 14. A coordinates system is predefined, in which an X-axis X is representative of a longitudinal axis of the motor vehicle 10, a Y-axis Y is representative of a transversal axis of the motor vehicle 10 and a Z-axis Z is representative of a vertical axis of the motor vehicle 10. The axes intersect in the center of gravity 14. A rear axle of the motor vehicle 10 has a wheel track S. The motor vehicle 10 also preferably has four wheels 12. The motor vehicle 10 may however also include more or fewer wheels 12.

A roll rate OMEGA_ROLL is representative of a rotation of the motor vehicle 10 about the transverse axis of the motor vehicle 10. A motor vehicle speed VEL_VEH represents a speed of the motor vehicle 10. A wheel speed VEL_WHEEL_1 of a first front wheel, a wheel speed VEL_WHEEL_2 of a second front wheel, a wheel speed VEL_WHEEL_3 of a first rear wheel and a wheel speed VEL_WHEEL_4 of a second rear wheel represent longitudinal speeds of the corresponding center of gravity of the wheel relative to a road surface, which is traveled on by the motor vehicle 10. The wheel speeds are preferably determined as a function of radii of the wheels 12 and as a function of angular speeds, with which the corresponding wheels 12 rotate about their own axles.

A roll rate sensor easily enables the roll rate OMEGA_ROLL of the motor vehicle 10 to be determined. The roll rate OMEGA_ROLL is preferably used to determine an orientation of the motor vehicle 10. A reference speed of the motor vehicle speed VEL_VEH can also be determined for instance as a function of the roll rate OMEGA_ROLL when driving round a sharp bend. This can contribute for instance to an automatic driving stability system, for instance a roll stability control or ESP system, being very precisely controllable.

A change in the temperature and/or an ageing process of the roll rate sensor may bring about or change a signal offset OFS_SIG of the roll rate sensor. The signal offset OFS_SIG is a zero point displacement, which causes the roll rate OMEGA_ROLL to be signaled larger or smaller than it actually is. The roll rate sensor is preferably a rotation rate sensor.

If it is known that the roll rate sensor is stationary, the signal offset OFS_SIG can be determined by averaging a signal OMEGA_ROLL_SIG of the roll rate sensor. The signal offset OFS_SIG may then be accounted for when determining the roll rate OMEGA_ROLL, so that the roll rate OMEGA_ROLL is also correctly determined in the case of different temperatures and/or with an older roll rate sensor.

A rolling of the motor vehicle 10 with the roll rate OMEGA_ROLL is regularly brought about by a change in a transversal acceleration AC of the motor vehicle 10. The transversal acceleration AC is approximately constant, the assumption can thus be made therefrom that the actual roll rate OMEGA_ROLL equates to zero. In particular, the actual roll rate OMEGA_ROLL is proportional to a temporal derivative DRV_AC of the transversal acceleration AC of the motor vehicle 10.

A first program for determining the signal offset OFS_SIG of the roll rate sensor is preferably stored on a storage medium of a control device in the motor vehicle 10. The first program is used to dynamically determine the signal offset OFS_SIG even while a motor vehicle 10 is traveling.

The first program is preferably started in step S10, in which variables are initialized if necessary.

In step S12, the signal OMEGA_ROLL_SIG of the roll rate sensor is determined.

In step S14, the transversal acceleration AC of the motor vehicle 10 is determined. The transversal acceleration AC of the motor vehicle 10 can be determined for instance by means of a transversal acceleration sensor. Alternatively hereto, the transversal acceleration AC can also be determined on the basis of the calculation specification specified in FIG. 4. According to this calculation specification, the transversal acceleration AC can be determined as a function of the track width S of the motor vehicle S, the wheel speed VEL_WHEEL_3 of the first rear wheel and the wheel speed VEL_WHEEL_4 of the second rear wheel.

The temporal derivative DRV_AC of the transversal acceleration AC of the motor vehicle 10 is determined in step S16.

In step S18, a check is carried out to determine whether a value of the temporal derivative DRV_AC of the transversal acceleration AC of the motor vehicle 10 is smaller than a predefined first threshold value THD_1. If the condition of step S18 is not fulfilled, the processing in step S12 is continued. If the condition of step S18 is fulfilled, the processing can be continued in step S20.

Figures 2, 4:
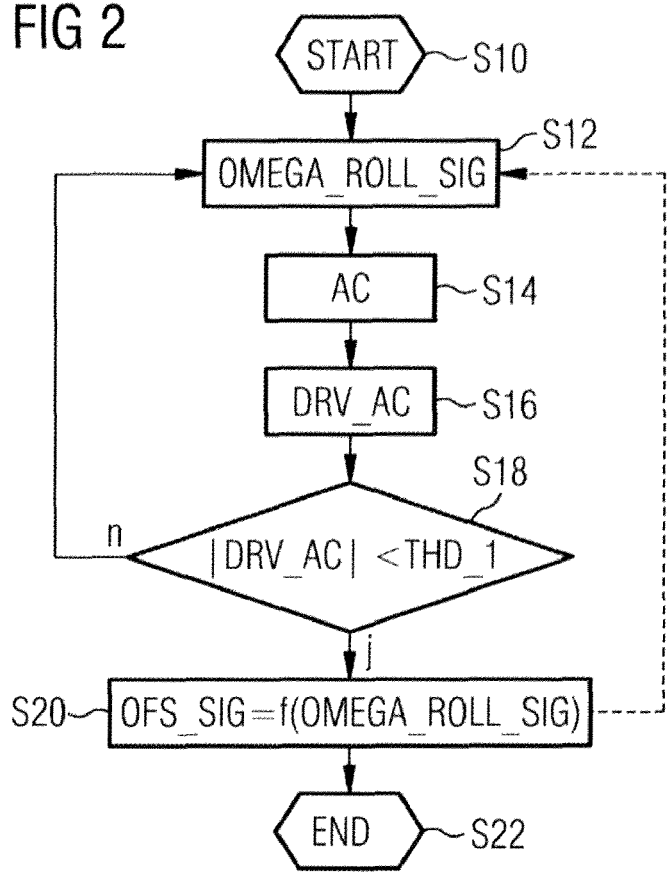
FIG. 2 shows a first flowchart of a method for determining a signal offset of a roll rate sensor.
FIG. 4 shows calculation specifications of the method for determining the signal offset of the roll rate sensor.

In step S20, the signal offset OFS_SIG is determined as a function of the signal OMEGA_ROLL_SIG of the roll rate sensor, preferably in accordance with the calculation specification specified in FIG. 4. According to this calculation specification, the signal OMEGA_ROLL_SIG of the roll rate sensor is determined over a period of time from a start time instant $t_0$ to an end time instant $t_1$. If the condition of step S18 is no longer fulfilled during the determination of the signal offset in step S20, the first program is interrupted. The signal offset OFS_SIG is preferably determined over a longer period of time, in which the determination of the signal offset OFS_SIG is interrupted repeatedly. Only the portion of the signal OMEGA_ROLL_SIG of the roll rate sensor is however used to determine the signal offset OFS_SIG, during the determination thereof, the condition of step S18 is fulfilled. Alternatively to the temporal averaging of the signal OMEGA_ROLL_SIG of the roll rate sensor, the individual values, of which the signal OMEGA_ROLL_SIG of the roll rate sensor consists, can also be averaged by way of the number of all detected values. Alternatively, the averaging can take place by means of a low pass filter.

In a step S22, the first program can be ended. The first program is however preferably regularly processed while the motor vehicle 10 is in operation.

Alternatively or in addition a second program for determining the signal offset OFS_SIG can be stored on the storage means of the control apparatus. The second program is used to reliably and precisely determine the signal offset OFS_SIG of the roll rate sensor when the motor vehicle 10 is stationary. For instance, the second program enables a very precise determination of the signal offset OFS_SIG, if the motor vehicle 10 is transported, for instance on a ferry or a transporter, since such situations can be identified and ruled out.

The second program is preferably started in a step S30, in which variables are if necessary initialized.

In a step S32, the signal OMEGA_ROLL_SIG of the roll rate sensor is detected.

In step S34, a temporal derivative DRV_SIG of the signal OMEGA_ROLL_SIG of the roll rate sensor is also determined.

In a step S36, a check is carried out to determine whether a value of the temporal derivative DRV_SIG of the signal OMEGA_ROLL_SIG of the roll rate sensor is smaller than a predefined second threshold value THD_2. This relates to the knowledge that the signal offset OFS_SIG generally provides a constant value to the signal OMEGA_ROLL_SIG of the roll rate sensor. If the temporal derivative DRV_SIG of the signal OMEGA_ROLL_SIG of the roll rate sensor is thus identical to or greater than the predefined second threshold value THD_2, then the actual signal OMEGA_ROLL_SIG of the roll rate sensor may not only be the signal offset OFS_SIG of the roll rate sensor. If the condition of the step S36 is not fulfilled, the processing is continued again in step S32. If the condition of step S36 is fulfilled, the processing is continued in step S38.

In step S38, a wheel speed VEL_WHEEL of at least one of the wheels 12 of the motor vehicle 10 is determined. The wheel speeds VEL_WHEEL of all wheels 12 are preferably determined, in particular the wheel speed VEL_WHEEL_1 of the first front wheel, the wheel speed VEL_WHEEL_2 of the second front wheel, the wheel speed VEL_WHEEL_3 of the first rear wheel and the wheel speed VEL_WHEEL_4 of the second rear wheel.

The motor vehicle speed VEL_VEH can also be determined in a step S40. This may be particularly advantageous if the motor vehicle speed VEL_VEH of the motor vehicle 10 is known independently of the wheel speed VEL_WHEEL of the wheels 12, for instance when an ABS system is used in the motor vehicle 10.

In step S42, a maximum selection MAX of the values of the wheel speeds VEL_WHEEL of the wheels 12 and, if the wheel speed VEL_VEH was determined in step S40, is determined from the value of the motor vehicle speed VEL_VEH of the motor vehicle 10. This means that a check is carried out to determine which of the values of the wheel speeds VEL_WHEEL of the wheels 12 and of the wheel speeds VEL_VEH is the largest. A check is consequently carried out to determine whether the largest of the values is smaller than a predefined third threshold value THD_3. If the condition in step S42 is not fulfilled, the processing is continued again in step S32. If the condition of step S42 is fulfilled, the processing can be continued in step S44.

In a step S44, the transversal acceleration AC of the motor vehicle 10 is determined.

In a step S46, the temporal derivative DRV_AC of the transversal acceleration AC of the motor vehicle 10 can be determined.

If in step S46 the temporal derivative DRV_AC of the transversal acceleration AC of the motor vehicle 10 was determined, a check can be carried out in step S48 to determine whether the value of the temporal derivative DRV_AC of the transversal acceleration AC is smaller than a predefined fourth threshold value THD_4. If the condition in step S48 is not fulfilled, the processing is continued again in step S32.

If the condition of step S48 is fulfilled, the processing is continued in step S50. In step S50, the signal offset OFS_SIG is determined as a function of the signal OMEGA_ROLL_SIG of the roll rate sensor in accordance with step S20 of the first program.

In a step S52, the second program can be terminated. The second program is preferably regularly processed during operation of the motor vehicle 10.

What is claimed is:

1. A method for determining a signal offset of a roll rate sensor of a motor vehicle, comprising the steps of:
    detecting a signal of the roll rate sensor,
    determining a transversal acceleration of the motor vehicle,
    determining a temporal derivative of the transversal acceleration,
    carrying out a check to determine whether a value of the temporal derivative of the transversal acceleration is smaller than a predefined first threshold value,
    determining the signal offset of the roll rate sensor as a function of the signal, if the value of the temporal derivative of the transversal acceleration is smaller than the predefined first threshold value.

2. The method according to claim 1, wherein the signal of the roll rate sensor is detected over a predefined period of time and the signal offset is only determined as a function of the portions of the signal of the roll rate sensor, which are detected while the value of the temporal derivative of the transversal acceleration is smaller than the predefined first threshold value.

3. The method according to claim 1, wherein the transversal acceleration of the motor vehicle is determined with a transversal acceleration sensor.

4. The method according to claim 1, wherein the transversal acceleration of the motor vehicle is determined as a function of at least two wheel speeds of wheels of the motor vehicle.

5. The method according to claim 1, wherein a temporal derivative of the signal of the roll rate sensor is determined and wherein the signal offset of the roll rate sensor is determined as a function of the signal of the roll rate sensor, if a value of the temporal derivative of the signal of the roll rate sensor is smaller than a predefined second threshold value.

6. The method according to claim 1, wherein the wheel speed of the at least one wheel of the motor vehicle is determined and wherein the signal offset of the roll rate sensor is determined as a function of the signal of the roll rate sensor, if a value of the determined wheel speed of the corresponding wheel is smaller than a predefined third threshold value.

7. The method according to claim 6, wherein a motor vehicle speed is determined and wherein the signal offset of the roll rate sensor is determined as a function of the signal of the roll rate sensor, if a value of the determined motor vehicle speed is smaller than the predefined third threshold value.

8. A device for determining a signal offset of a roll rate sensor of a motor vehicle, the device being operable to
detect a signal of the roll rate sensor,
determine a transversal acceleration of the motor vehicle,
determine a temporal derivative of the transversal acceleration,
carry out a check to determine whether a value of the temporal derivative of the transversal acceleration is smaller than a predefined first threshold value, and to determine the signal offset of the roll rate sensor as a function of the signal of the roll rate sensor, if the value of the temporal derivative of the transversal acceleration is smaller than the predefined first threshold value.

9. The device according to claim 8, wherein the device is further operable to detect the signal of the roll rate sensor over a predefined period of time and the signal offset is only determined as a function of the portions of the signal of the roll rate sensor, which are detected while the value of the temporal derivative of the transversal acceleration is smaller than the predefined first threshold value.

10. The device according to claim 8, comprising a transversal acceleration sensor for determining the transversal acceleration of the motor vehicle.

11. The device according to claim 8, wherein the device is further operable to determine the transversal acceleration of the motor vehicle as a function of at least two wheel speeds of wheels of the motor vehicle.

12. The device according to claim 8, wherein the device is further operable to determine a temporal derivative of the signal of the roll rate sensor and to determine the signal offset of the roll rate sensor as a function of the signal of the roll rate sensor, if a value of the temporal derivative of the signal of the roll rate sensor is smaller than a predefined second threshold value.

13. The device according to claim 8, wherein the device is further operable to determine the wheel speed of the at least one wheel of the motor vehicle and to determine the signal offset of the roll rate sensor as a function of the signal of the roll rate sensor, if a value of the determined wheel speed of the corresponding wheel is smaller than a predefined third threshold value.

14. The device according to claim 13, wherein the device is further operable to determine a motor vehicle speed and to determine the signal offset of the roll rate sensor as a function of the signal of the roll rate sensor, if a value of the determined motor vehicle speed is smaller than the predefined third threshold value.

* * * * *